United States Patent Office 3,414,585
Patented Dec. 3, 1968

3,414,585
**INTERMEDIATES FOR PYRROLO[2,1-b][1,3]
OXAZIN-6-ONES**
William J. Houlihan, Mountain Lakes, N.J., assignor to
Sandoz Inc., Hanover, N.J.
No Drawing. Original application Feb. 16, 1965, Ser. No.
433,181, now Patent No. 3,334,095, dated Aug 1, 1967.
Divided and this application Mar. 15, 1967, Ser. No.
623,237
15 Claims. (Cl. 260—326.5)

ABSTRACT OF THE DISCLOSURE

Pyrrolo[2,1-b][1,3]oxazin-6-ones useful as sedatives are prepared by heating in inert solvent the corresponding intermediates, e.g., N-(3-hydroxypropyl)-3-(p-methyl benzoyl) propionamide.

---

This application is a division of my copending application Ser. No. 433,181, filed Feb. 16, 1965, now Patent 3,334,095 issued Aug. 1, 1967.

The instant invention is directed to intermediates in the preparation of two distinct genera of the following formulae:

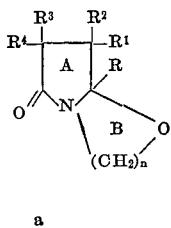 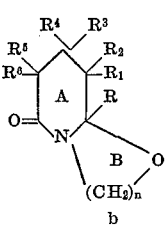

a            b

Each genus has two subgenera dependent upon the value of $n$:

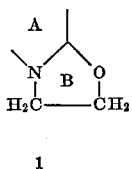 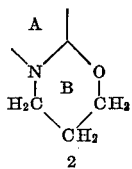

1            2

The following definitions are employed throughout the text:

R is either lower straight chain alkyl, e.g., methyl, ethyl, propyl and butyl; aryl, e.g., phenyl; or ar(lower) alkyl, e.g., benzyl and phenethyl;

Aryl and the ar- of ar(lower)alkyl are of the formula

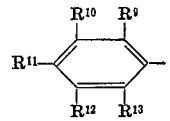

Each of $R^1$, $R^2$, $R^3$, $R^4$, $R^5$, and $R^6$ is either a hydrogen atom (—H) or one of the following functional groups: lower straight chain alkyl, e.g., methyl, ethyl, propyl and butyl; aryl, e.g. parachlorophenyl; ar(lower) alkyl, e.g., 3,5-dimethylbenzyl; and, together with its counterpart on the same ring carbon atom, polymethylene having from 4 to 6 carbon atoms, e.g. tetramethylene, pentamethylene and hexamethylene; with the proviso that (a) there are no more than three of said functional groups on two adjacent carbon atoms, (b) at least one of $R^1$ and $R^2$ is hydrogen when R is aryl or ar(lower) alkyl; (c) a plurality of polymethylene groups are not bound to adjacent carbon atoms, and (d) there are a maximum of four of said functional groups on Compound $Ib$;

Each of $R^9$, $R^{10}$, $R^{11}$, $R^{12}$ and $R^{13}$ is either a hydrogen atom (—H); a chlorine atom (—Cl); a fluorine atom (—F); a bromine atom (—Br); lower alkyl, preferably having from 1 to 4 carbon atoms, e.g., methyl, ethyl, propyl, isopropyl and butyl; lower alkoxy, preferably having from 1 to 4 carbon atoms, e.g., methoxy, ethoxy, propoxy, isopropoxy and butoxy; trifluoromethyl (—CF$_3$); lower alkylthio, preferably having from 1 to 4 carbon atoms, e.g., methylthio, ethylthio, propylthio, isopropylthio and butylthio; or, together with its counterpart on an adjacent ring carbon atom, methylenedioxy (—O—CH$_2$—O)

with the proviso that (a) at least one of $R^9$, $R^{10}$, $R^{11}$, $R^{12}$ and $R^{13}$ is a hydrogen atom in each aryl and in each ar(lower)alkyl group, (b) a plurality of trifluoromethyl groups are not bound to adjacent carbon atoms, (c) each $R^9$ and $R^{13}$ of aryl and aralkyl groups is a hydrogen atom in a plurality of such groups bound to the same ring carbon atom, and (d) each of $R^9$ of aryl and aralkyl groups is a hydrogen atom in a plurality of such groups bound to adjacent ring carbon atoms;

$n$ is one of the integers 2 and 3;

A is the azacycloalkanone ring of Compounds I; and

B is the diheterocyclic ring of Compound I.

There are several methods of preparing Compounds I. The reaction schemes for two of these methods are presented for the instance when each of $R^1$ to $R^6$ is a hydrogen atom. However, having any of the contemplated functional groups in embodied positions does not alter said methods.

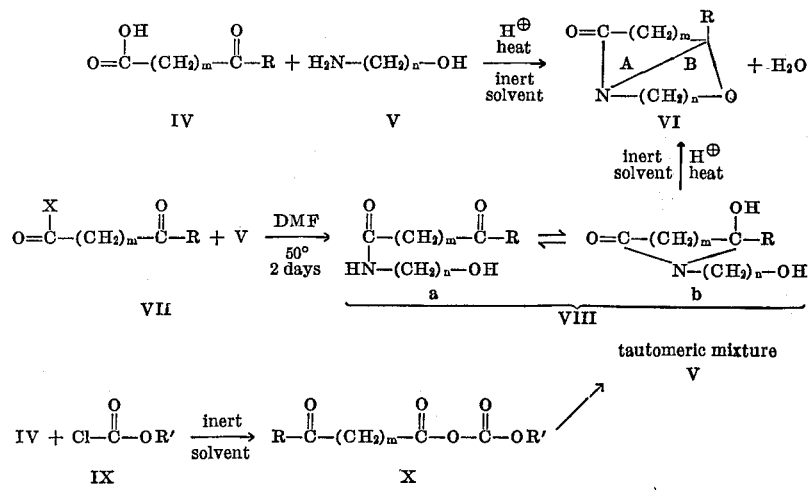

wherein

R' is lower alkyl preferably having from 1 to 5 carbon atoms, e.g., methyl, ethyl, propyl, isopropyl, butyl and amyl;

m is one of the integers 2 and 3; and

X is either a chlorine atom (—Cl) or a bromine atom (—Br).

The tautomeric mixture VIII is separated into its chemical individuals by known procedures, but such separation is not required to prepare Compound VI, which is a particular subgroup of Compounds I.

The reaction of IV with an alkyl chloroformate (alkyl chlorocarbonate) IX is effected in an inert solvent, e.g., toluene and diethylether, at a temperature from —10° to 100° C., preferably with the range of from —10° to 50° C. Stirring may be employed, but is not required.

For the noted reaction schemes only a catalytic amount of hydrogen ions is needed, as indicated. This is provided by a catalytic quantity of, e.g. paratoluenesulfonic acid. The inert solvent is any solvent, e.g., xylene, which is inert to both the reactants and the reaction products under the employed conditions. The heat that is indicated may vary, but reflux conditions are preferred.

The classes of compounds obtainable from the compounds within the scope of this invention are:

I$a$1: 2,3,5,6,7,7a-hexahydro-pyrrolo[2,1-b]oxazol-5-ones;
I$a$2: 3,4,6,7,8,8a-hexahydro-2H-pyrrolo[2,1-b][1,3]oxazin-6-ones;
I$b$1: 2,3,6,7,8,8a-hexahydro-5H-oxazolo[3,2-a]pyridin-5-ones;
I$b$2: 2,3,7,8,9,9a-hexahydro-4H,6H-pyrido[2,1-b][1,3]oxazin-6-ones.

Compounds I are CNS (central nervous system) active, e.g. depressants and sedatives, compounds and are useful as such. Compounds I are administered either orally or parenterally in daily doses of from 75 milligrams to 200 milligrams.

Each of the pharmaceutically active compounds of this invention, may be, e.g. incorporated, for oral administration, in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD–30 and purified water. An exemplary tabletting formulation for the instant active compounds is:

| | Parts |
|---|---|
| 8a-phenyl-3,4,6,7,8,8a-hexahydro-2H-pyrrolo[2,1-b][1,3]oxazin-6-one | 50 |
| Tragacanth | 2 |
| Lactose | 39.5 |
| Corn starch | 5 |
| Talcum | 3 |
| Magnesium stearate | 0.5 |
| Alcohol SD–30 | q.s. |
| Purified water | |

In the examples which follow, the parts and percentages are by weight unless otherwise specified, and the temperatures are in degrees centigrade. The relationship between parts by weight and parts by volume is the same as that between the kilogram and the liter.

Example 1.—8a-(4-methoxyphenyl)-3,4,6,7,8,8a-hexahydro-2H-pyrrolo[2,1-b][1,3]oxazin-6-one

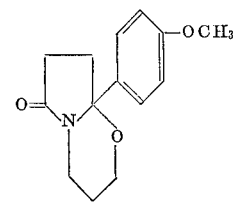

Charge a flask (equipped with a magnetic stirring bar, condenser, thermometer and dropping funnel) with 4.0 parts (0.02 mole) of 3-(p-methoxybenzoyl)-propionic acid, 2.0 parts (0.02 mole) of triethylamine and 40 parts by volume of chloroform. Stir the obtained solution and cool same to 0°. Add dropwise to the thus-cooled solution a solution [2.2 parts (0.02 mole) of ethyl chloroformate (ethyl chlorocarbonate) in 20 parts by volume of chloroform] at such a rate that the internal temperature of the product does not exceed 10°.

Continue stirring for an additional 2.5 hours before adding dropwise to the resultant solution 3 parts by volume of 3-aminopropanol.

Stir the thus-produced solution overnight (17 hours) at room temperature (20°). Decant the chloroform solution from the flask, and wash said solution with water, 1 N hydrochloric acid and saturated (aq.) sodium chloride solution. Dry the washed solution with sodium sulfate. Thereafter remove the solvent in vacuo on a rotary evaporator.

Crystallize the resultant oil from methylene chloride/diethylether to obtain 2.4 parts of N-(3-hydroxypropyl)-3-(p-methoxybenzoyl)-propionamide, M.P. 99° to 101°.

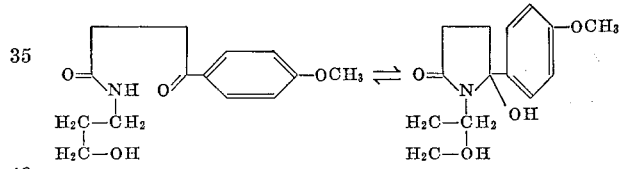

Charge a flask (equipped with a stirrer, heating mantle, condenser and a Dean-Stark tube) with 5.2 parts of N-(3-hydroxypropyl)-3-(p-methoxybenzoyl)-propionamide, 0.5 part of p-toluenesulfonic acid and 200 parts by volume of toluene. Stir and reflux the contents of the flask until water ceases to separate in the Dean-Stark tube. Remove the solvent on a rotary evaporator.

Dissolve the resultant oil in methanol/water. Admix the obtained solution with charcoal before removing the methanol/water in vacuo. There are thus obtained 3.9 parts of title compound, M.P. 64° to 68°, B.P. 150° to 160° at 1.5 mm.

Example 2.—8a-(3,4,6,7,8,8a-hexahydro-2H-pyrrolo[2,1-b][1,3]oxazin-6-one

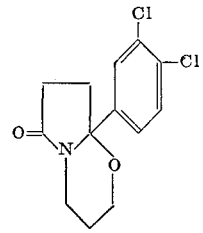

Charge a flask (equipped with a magnetic stirring bar, condenser, thermometer and dropping funnel) with 19.8 parts (0.08 mole) of 3 - (3,4 - dichlorobenzoyl)propionic acid, 8.0 parts (0.08 mole) of triethylamine and 160 parts by volume of chloroform. Stir the obtained solution and cool same to 0°. Add dropwise to the thus-cooled solution a solution [8.8 parts (0.08 mole) of ethyl chloroformate in 80 parts by volume of chloroform] at such a rate that the internal temperature of the product does not exceed 10°.

Continue stirring for an additional 2.5 hours before adding dropwise to the resultant solution 12 parts by volume (0.08 mole) of 3-aminopropanol.

Stir the thus-produced solution overnight at room temperature. Decant the chloroform solution from the flask, and wash said solution with water, 1 N hydrochloric acid and saturated (aq.) sodium chloride solution. Dry the washed solution with sodium sulfate. Thereafter remove the solvent in vacuo on a rotary evaporator.

Crystallize the resultant oil from methylene chloride/ diethylether to obtain 13.0 parts of N-(3-hydroxypropyl)- 3 - (3,4 - dichlorobenzoyl) - propionamide, M.P. 130° to 140°.

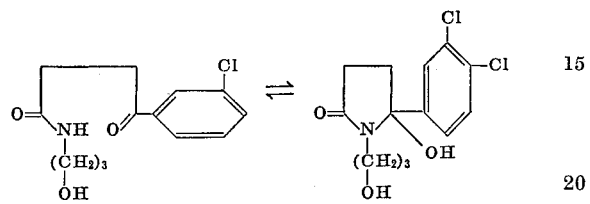

Charge a flask (equipped with a stirrer, heating mantle, condenser and a Dean-Stark tube) with 8.0 parts of N- (3 - hydroxypropyl) - 3 - (3,4 - dichlorobenzoyl) - propionamide, 0.5 part of para-toluenesulfonic acid and 250 parts by volume of toluene. Stir and reflux the contents of the flask until water ceases to separate in the Dean-Stark tube. Remove the solvent on a rotary evaporator.

Dissolve the resultant oil in methylene chloride/pentane. Admix the obtained solution with charcoal before removing the methylene chloride pentane in vacuo. There are thus obtained 4.0 parts of title compound M.P. 117° to 120°.

Example 3.—8a-(4-fluorophenyl)-3,4,6,7,8,8a-hexahydro-2H-pyrrolo[2,1-b][1,3]oxazin-6-one

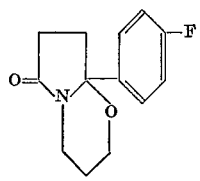

Charge a flask (equipped with a magnetic stirring bar, condenser, thermometer and dropping funnel) with 19.6 parts (0.10 mole) of 3 - (4 - fluorobenzoyl) propionic acid, 10 parts (0.010 mole) of triethylamine and 200 parts by volume of chloroform. Stir the obtained solution and cool same to 0°. Add dropwise to the thus-cooled solution a solution [11.0 parts (0.10 mole) of ethyl chloroformate in 100 parts by volume of chloroform] at such a rate that the internal temperature of the product does not exceed 10°.

Continue stirring for an additional 2.5 hours before adding dropwise to the resultant solution 15 parts by volume of (0.10 mole) 3-aminopropanol.

Stir the thus-produced solution overnight at room temperature. Decant the chloroform solution from the flask, an dwash said solution with water, 1 N hydrochloric acid and saturated (aq.) sodium chloride solution. Dry the washed solution with sodium sulfate. Thereafter remove the solvent in vacuo on a rotary evaporator.

Crystallize the resultant oil from methylene chloride/ diethylether to obtain 13.2 parts of N - (3 - hydroxypropyl) - 3 - (4-fluorobenzoyl)-propionamide, M.P. 87° to 89°.

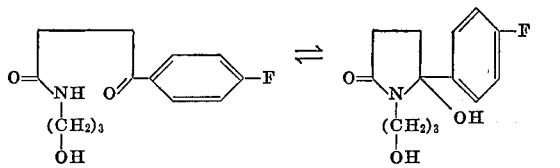

Charge a flask (equipped with a stirrer, heating mantle, condenser and a Dean-Stark tube) with 8.2 parts of N- (3 - hydroxypropyl) - 3 - (4 - fluorobenzoyl)-propionamide, 0.5 part of para-toluenesulfonic acid and 200 parts by volume of toluene. Stir and reflux the contents of the flask until water ceases to separate in the Dean-Stark tube. Remove the solvent on a rotary evaporator.

Dissolve the resultant oil in methanol/water. Admix the obtained solution with charcoal before removing the methanol/water in vacuo. There are thus obtained 6.7 parts of title compound, M.P. 85° to 88°, B.P. 160° to 180° at 1.5 mm.

Example 4.—8a-(4-methylphenyl)-3,4,6,7,8,8a-hexahydro-2H-pyrrolo-[2,1-b][1,3]oxazin-6-one

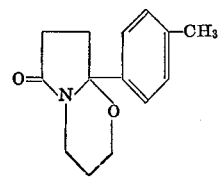

Charge a flask (equipped with a magnetic stirring bar, condenser, thermometer and dropping funnel) with 15.4 parts (0.08 mole) of 3 - (4 - methylbenzoyl)-propionic acid, 8.0 parts (0.08 mole) of triethylamine and 160 parts by volume of chloroform. Stir the obtained solution and cool same to 0°. Add dropwise to the thus-cooled solution a solution [8.8 parts (0.08 mole) of ethyl chloroformate in 80 parts by volume of chloroform] at such a rate that the internal temperature of the product does not exceed 10°.

Continue stirring for an additional 2.5 hours before adding dropwise to the resultant solution 12 parts by volume (0.08 mole) of 3-aminopropanol.

Stir the thus-produced solution overnight at room temperature. Decant the chloroform solution from the flask, and wash said solution with water, 1 N hydrochloric acid and saturated (aq.) sodium chloride solution. Dry the washed solution with sodium sulfate. Thereafter remove the solent in vacuo on a rotary evaporator.

Crystallize the resultant oil from methylene chloride/ diethylether to obtain 13.3 parts of N - (3 - hydroxypropyl - 3 - (4-methylbenzoyl)-propionamide, M.P. 101° to 102°.

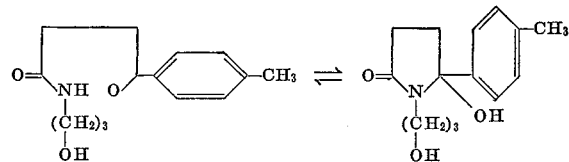

Charge a flask (equipped with a stirrer, heating mantle, condenser and a Dean-Stark tube) with 8.0 parts of N- (3-hydroxypropyl) - 3-(4-methyl-benzoyl)-propionamide, 0.5 part of paratoluenesulfonic acid and 200 parts by volume of toluene. Stir and reflux the contents of the flask until water ceases to separate in the Dean-Stark tube. Remove the solvent on a rotary evaporator.

Dissolve the resultant oil in methanol/water. Admix the obtained solution with charcoal before removing the methanol/water in vacuo. There are thus obtained 5.7 parts of title compound, B.P. 130° to 150° at 1.5 mm.

Example 5.—8a-(2,4-dimethylphenyl)-3,4,7,8,8a-hexahydro-2H-pyrrolo[2,1-b][1,3]oxazin-6-one

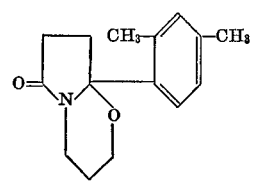

Charge a flask (equipped with a magnetic stirring bar, condenser, thermometer and dropping funnel) with 4.1 parts (0.02 mole) of 3-(2,4-dimethylbenzoyl)-propionic acid, 2.0 parts (0.02 mole) of triethylamine and 40 parts by volume of chloroform. Stir the obtained solution and cool same to 0°. Add dropwise to the thus-cooled solution a solution [2.2 parts (0.02 mole) ethyl chloroformate in 20 parts by volume of chloroform] at such a rate that the internal temperature of the product does not exceed 10°.

Continue stirring for an additional 2.5 hours before adding dropwise to the resultant solution 3.0 parts by volume (0.02 mole) of 3-aminopropanol.

Stir the thus-produced solution overnight at room temperature. Decant the chloroform solution from the flask, and wash said solution with water, 1 N hydrochloric acid and saturated (aq.) sodium chloride solution. Dry the washed solution with sodium sulfate. Thereafter remove the solvent in vacuo on a rotary evaporator.

Crystallize the resultant oil from methylene chloride/ diethyl ether to obtain 2.1 parts of N-(3-hydroxypropyl)-3-(2,4-dimethylbenzoyl) propionamide M.P. 65° to 67°.

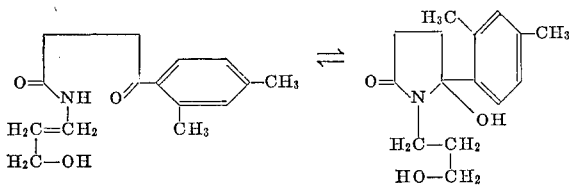

Charge a flask (equipped with a stirrer, heating mantle, condenser and a Dean-Stark tube) with 20.6 parts (0.10 mole) of 3-(2,4-dimethylbenzoyl) propionic acid, 15.0 parts (0.20 mole) of 3-aminopropanol, 1.0 part of p-toluenesulfonic acid and 250 parts by volume of xylene. Stir and reflux the contents of the flask until water ceases to separate in the Dean-Stark tube. Remove the solvent on a rotary evaporator.

Dissolve the resultant oil in methanol/water. Admix the obtained solution with charcoal before removing the methanol/water in vacuo. There are thus obtained 16.4 parts of title compound, M.P. 69° to 73°, B.P. 160° at 0.25 mm.

Example 6.—8a-(2, 5-dimethylphenyl)-3,4,6,7,8,8a-hexahydro-2H-pyrrolo[2,1-b][1,3]oxazin-6-one

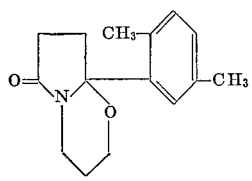

Charge a flask (equipped with a magnetic stirring bar, condenser, thermometer and dropping funnel) with 4.1 parts (0.02 mole) of 3-(2,5-dimethylbenzoyl) propionic acid, 2.0 parts (0.02 mole) of triethylamine and 40 parts by volume of chloroform. Stir the obtained solution and cool same to 0°. Add dropwise to the thus-cooled solution a solution [2.2 parts (0.02 mole) of ethyl chloroformate in 20 parts by volume of chloroform] at such a rate that the internal temperature of the product does not exceed 10°.

Continue stirring for an additional 2.5 hours before adding dropwise to the resultant solution 3 parts by volume of 3-aminopropanol.

Stir the thus-produced solution overnight at room temperature. Decant the chloroform solution from the flask, and wash said solution with water, 1 N hydrochloric acid and saturated (aq.) sodium chloride solution. Dry the washed solution with sodium sulfate. Thereafter remove the solvent in vacuo on a rotary evaporator.

Crystallize the resultant oil from methylene chloride/ diethyl-ether to obtain 2.5 parts of N-(3-hydroxypropyl)-3-(2,5-dimethylbenzoyl)-propionamide, M.P. 65° to 67°.

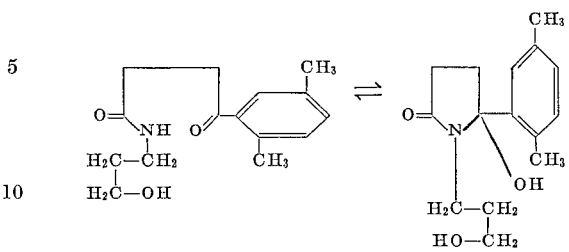

Charge a flask (equipped with a stirrer, heating mantle, condenser and a Dean-Stark tube) with 25.7 parts of N-(3-hydroxypropyl)-3-(2,5-dimethylbenzoyl)-propionamide, 1.0 part of p-toluenesulfonic acid and 500 parts by volume of toluene. Stir and reflux the contents of the flask until water ceases to separate in the Dean-Stark tube. Remove the solvent on a rotary evaporator.

Dissolve the resultant oil in methanol/water. Admix the obtained solution with charcoal before removing the methanol/water in vacuo. There are thus obtained 13.7 parts of title compound, B.P. 130° to 150° at 0.2 mm.

Example 7.—8a-(4-chlorophenyl)-3,4,6,7,8,8a-hexahydro-2H-pyrrolo[2,1-b][1,3]oxazin-6-one

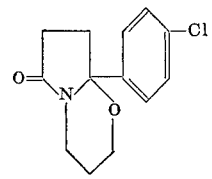

Charge a flask (equipped with a magnetic stirring bar, condenser, thermometer and dropping funnel) with 21.3 parts (0.10 mole) of 3-(p-chlorobenzoyl)-propionic acid, 10 parts (0.10 mole) of triethylamine and 200 parts by volume of chloroform. Stir the obtained solution and cool same to 0°. Add dropwise to the thus-cooled solution a solution [11.0 parts (0.10 mole) of ethyl chloroformate in 100 parts by volume of chloroform] at such a rate that the internal temperature of the product does not exceed 10°.

Continue stirring for an additional 2.5 hours before adding dropwise to the resultant solution 15 parts by volume of 3-aminopropanol.

Stir the thus-produced solution overnight at room temperature. Decant the chloroform solution from the flask, and wash said solution with water, 1 N hydrochloric acid and saturated (aq.) sodium chloride solution. Dry the washed solution with sodium sulfate. Thereafter remove the solvent in vacuo on a rotary evaporator.

Crystallize the resultant oil from methylene chloride/ diethylether to obtain 13.8 parts of N-(3-hydroxypropyl)-3-(p-chlorobenzoyl)-propionamide, M.P. 85° to 87°.

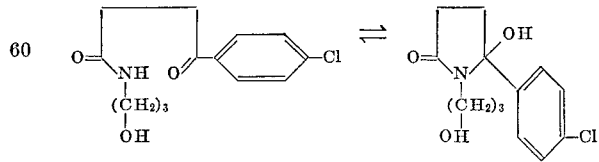

Charge a flask (equipped with a stirrer, heating mantle, condenser and a Dean-Stark tube) with 8.8 parts of N-(3-hydroxypropyl) - 3 - (p-chlorobenzoyl)-propionamide, 0.5 part of p-toluenesulfonic acid and 200 parts by volume of toluene. Stir and reflux the contents of the flask until water ceases to separate in the Dean-Stark tube. Remove the solvent on a rotary evaporator.

Dissolve the resultant oil in methylene chloride/pentane. Admix the obtained solution with charcoal before removing the methylene chloride/pentane in vacuo. There are thus obtained 6.6 parts of title compound M.P. 63° to 65°, B.P. 160° to 180° at 1.5 mm.

Various changes may be made in the structure of Compound I without departing from the spirit and scope of the invention or sacrificing its material advantages. The enumerated exemplary compounds and the working examples merely provide illustrative embodiments.

What is claimed is:

1. A compound selected from the group consisting of compounds of the formulae

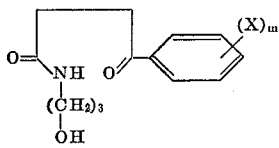

and

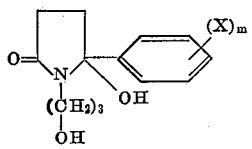

where X represents chloro, fluoro, $C_{1-4}$ alkyl, or $C_{1-4}$ alkoxy, and $m$ is 1 or 2.

2. The compound of claim 1 which is N-(3-hydroxypropyl)-3-(p-methoxybenzoyl)propionamide.

3. The compound of claim 1 which is 5-hydroxy-1-(3-hydroxypropyl)-5-(p-methoxyphenyl)pyrrolidin-2-one.

4. The compound of claim 1 which is 3-(3,4-dichlorobenzoyl)-N-(3-hydroxypropyl)propionamide.

5. The compound of claim 1 which is 5-(3,4-dichlorophenyl)-5-hydroxy-1-(3-hydroxypropyl)pyrrolidin-2-one.

6. The compound of claim 1 which is 3-(p-fluorobenzoyl)-N-(3-hydroxypropyl)propionamide.

7. The compound of claim 1 which is 5-(p-fluorophenyl)-5-hydroxy-1-(3-hydroxypropyl)pyrrolidin-2-one.

8. The compound of claim 1 which is N-(3-hydroxypropyl)-3-(p-methylbenzoyl)propionamide.

9. The compound of claim 1 which is 5-hydroxy-1-(3-hydroxypropyl)-5-(p-tolyl)pyrrolidin-2-one.

10. The compound of claim 1 which is 3-(2,4-dimethylbenzoyl)-N-(3-hydroxypropyl)propionamide.

11. The compound of claim 1 which is 5-(2,4-dimethylphenyl)-5-hydroxy-1-(3-hydroxypropyl)pyrrolidin-2-one.

12. The compound of claim 1 which is 3-(2,5-dimethylbenzoyl)-N-(3-hydroxypropyl)propionamide.

13. The compound of claim 1 which is 5-(2,5-dimethylphenyl)-5-hydroxy-1-(3-hydroxypropyl)pyrrolidin-2-one.

14. The compound of claim 1 which is 3-(p-chlorobenzoyl)-N-(3-hydroxypropyl)propionamide.

15. The compound of claim 1 which is 5-(p-chlorophenyl)-5-hydroxy-1-(3-hydroxypropyl)pyrrolidin-2-one.

No references cited.

NICHOLAS S. RIZZO, *Primary Examiner.*
JOSE TOVAR, *Assistant Examiner.*